United States Patent
Kakioka et al.

(10) Patent No.: US 11,443,068 B2
(45) Date of Patent: *Sep. 13, 2022

(54) DATA RECOVERY DEVICE, DATA MANAGEMENT SERVER, DATA MANAGEMENT SYSTEM, DATA RECOVERY METHOD AND PROGRAM

(71) Applicants: SATORI ELECTRIC CO., LTD., Tokyo (JP); A•T COMMUNICATIONS CO., LTD., Tokyo (JP)

(72) Inventors: Takafumi Kakioka, Tokyo (JP); Hiroshi Toyoizumi, Tokyo (JP); Youichi Azuma, Tokyo (JP)

(73) Assignees: SATORI ELECTRIC CO., LTD., Tokyo (JP); A•T COMMUNICATIONS CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,661

(22) Filed: Nov. 15, 2021

(65) Prior Publication Data

US 2022/0092222 A1     Mar. 24, 2022

Related U.S. Application Data

(62) Division of application No. 17/263,008, filed as application No. PCT/JP2019/014561 on Apr. 1, 2019, now Pat. No. 11,200,344.

(51) Int. Cl.
   *G06F 21/00*       (2013.01)
   *G06F 21/64*       (2013.01)
(Continued)

(52) U.S. Cl.
   CPC .......... *G06F 21/645* (2013.01); *G06F 21/606* (2013.01); *G06F 21/88* (2013.01)

(58) Field of Classification Search
   CPC ....... G06F 21/645; G06F 21/606; G06F 21/88
   See application file for complete search history.

(56) References Cited

U.S. PATENT DOCUMENTS 7,222,194 B2    5/2007   Kano et al.
8,874,911 B2 *  10/2014  Kudo .................. H04L 61/2546
                                              713/168
(Continued)

FOREIGN PATENT DOCUMENTS

CN         102300093 A    12/2011
CN         105743906 A     7/2016
(Continued)

*Primary Examiner* — Kendall Dolly
(74) *Attorney, Agent, or Firm* — R Neil Sudol; Henry D. Coleman

(57) ABSTRACT

The invention prevents data from leaking. In a data management system (1), a terminal device (2) saves a remaining data among the remaining data and an incomplete data acquired by partitioning an image data of an ID card of a user in a storage unit, and uploads the incomplete data to a data management server (5) via a network (N). A data recovery device (4) acquires the remaining data from the terminal device (2), and acquires the incomplete data from the data management server (5) via the network (N). Further, the data recovery device (4) recovers the image data of the ID card of the user from the remaining data and the incomplete data.

20 Claims, 8 Drawing Sheets

(51) Int. Cl.
*G06F 21/60* (2013.01)
*G06F 21/88* (2013.01)

(56) References Cited

U.S. PATENT DOCUMENTS

| | | | | |
|---|---|---|---|---|
| 10,095,706 | B2 * | 10/2018 | Tsurusawa | .............. G06F 16/22 |
| 10,396,899 | B1 * | 8/2019 | Kim | .................... H04B 10/541 |
| 10,719,887 | B2 * | 7/2020 | Nakayama | ............. G06Q 40/12 |
| 2007/0104007 | A1 | 5/2007 | Mizuno | |
| 2010/0058476 | A1 | 3/2010 | Isoda | |

FOREIGN PATENT DOCUMENTS

| | | | |
|---|---|---|---|
| JP | 2006295758 | A | 10/2006 |
| JP | 2007066061 | A | 3/2007 |
| JP | 2007078739 | A | 3/2007 |
| JP | 2007272775 | A | 10/2007 |
| JP | 2007334671 | A | 12/2007 |
| JP | 2008066793 | A | 3/2008 |
| JP | 4167476 | B2 | 10/2008 |
| JP | 2011145857 | A | 7/2011 |
| JP | 2017107339 | A | 6/2017 |

* cited by examiner

DATA RECOVERY DEVICE, DATA MANAGEMENT SERVER, DATA MANAGEMENT SYSTEM, DATA RECOVERY METHOD AND PROGRAM

TECHNICAL FIELD

The present invention relates to a data recovery device, a data management server, a data management system, a data recovery method and a program, and more particularly to a data recovery device, a data management server, a data management system, a data recovery method and a program which can prevent data from leaking.

BACKGROUND ART

There is disclosed an ID card common authentication system for executing an authentication by using an ID card which is carried by each of members of a plurality of organizations and stores an ID card data of the member, in which the ID card common authentication system includes an ID card DB which unitarily and previously stores the ID card data according to the plurality of organizations, and an ID card inquiry terminal which is provided in the plurality of organizations and executes an inquiry of the data of the ID card with the ID card DB via a read network (refer, for example, to patent literature 1). A whole of specification, claims and drawings of the patent literature 1 are incorporated into the present specification as reference.

CITATION LIST

Patent Literature

Patent Literature 1: Japanese Unexamined Patent Document 2011-145857

SUMMARY OF INVENTION

Technical Problem

However, in the ID card common authentication system described in the patent literature 1, it is necessary to previously store the ID card data in the ID card DB, and it is also necessary to transmit the read ID card data to the ID card DB via a network. Thus, the data is at high risk of leaking by cracking.

The present invention is made by solving the problem mentioned above, and an object of the present invention is to provide a data recovery device, a data management server, a data management system, a data recovery method and a program which can prevent the data from leaking.

Solution to Problem

In order to achieve the object mentioned above, a data recovery device (4) according to a first aspect of the present invention comprises:

a terminal device (2) which saves a first data among the first data and a second data and uploads the second data to a data management server (5) via a network (N), the first data and the second data being obtained by partitioning a binary data, wherein the data recovery device (4) acquires the first data from the terminal device (2), acquires the second data corresponding to the acquired first data from the data management server (5) via the network (N), and recovers the binary data from the acquired first data and second data.

A data management server (5) according to a second aspect of the present invention comprises:

a terminal device (2) which saves a first data among the first data and a second data in association with an identification information and uploads the second data and the identification information via a network (N), the first data and the second data being obtained by partitioning a binary data, and the identification information being capable of identifying the first data and the second data; and a data recovery device (4) which recovers the binary data from the first data and the second data, the data management server (5) being connected to the terminal device (2) and the data recovery device (4) via the network (N), wherein the data management server (5) comprises:

a storage unit (52) which saves the second data uploaded from the terminal device (2) and the identification information in association with each other; and a control unit (53) which detects the second data corresponding to the identification information from the storage unit (52) in response to receiving the identification information transmitted from the data recovery device (4) acquiring the first data and the identification information from the terminal device (2) via the network (N), and transmits the detected second data to the data recovery device (4) via the network (N), thereby allowing the data recovery device (4) to recovery the binary data.

A data management system (1) according to a third aspect of the present invention comprises:

a data management server (5) which saves a first data among the first data and a second data in association with an identification information and is connected via a network (N) to a terminal device (2) uploading the second data and the identification information via the network (N), the first data and the second data being obtained by partitioning a binary data, and the identification information being capable of identifying the first data and the second data; and a data recovery device (4) which is connected to the data management server (5) via the network (N) and recovers the binary data from the first data and the second data, wherein the data management server (5) comprises:

a storage unit (52) which saves the second data and the identification information in association with each other, the second data and the identification information being uploaded from the terminal device (2); and a control unit (53) which detects the second data corresponding to the identification information from the storage unit (52) in response to receiving the identification information transmitted from the data recovery device (4) via the network (N), and transmits the detected second data to the data recovery device (4) via the network (N), wherein the data recovery device (4) acquires the first data and the identification information from the terminal device (2), transmits the identification information to the data management server (5) via the network (N), and in response to receiving the second data corresponding to the identification information transmitted from the data management server (5) via the network (N), recovers the binary data from the received second data and the first data acquired from the terminal device (2).

In the data management system (1) mentioned above, the terminal device (2) may be adapted to display a data code (400) indicating the first data and the identification information, and the data recovery device (4) may be adapted to acquire the first data and the identification information indicated by the data code (400) displayed on the terminal device (2).

In the data management system (1) mentioned above, a generation time of the data code (400) may be embedded in the data code (400), the data recovery device (4) may be adapted to acquire the generation time of the data code (400) from the data code (400) displayed on the terminal device (2), and transmit the identification information and the generation time of the data code (400) to the data management server (5) via the network (N), and the control unit (53) may be adapted to discriminate whether or not being within a prescribed time period from the generation time of the data code (400) in response to receiving the identification information and the generation time of the data code (400) which are transmitted from the data recovery device (4) via the network (N), and transmit the second data corresponding to the identification information to the data recovery device via the network (N) under the condition of being within the prescribed time period.

A data recovery method according to a fourth aspect of the present invention comprises the steps of:

saving a first data among the first data and a second data which are obtained by partitioning a binary data, and acquiring the first data from a terminal device (2) which uploads the second data to a data management server (5) via a network (N);

acquiring the second data corresponding to the acquired first data from the data management server (5) via the network (N); and recovering the binary data from the acquired first data and second data.

A data recovery method according to a fifth aspect of the present invention is executed by a data management server (5) comprising: a storage unit (52) which is connected to a terminal device (2) and a data recovery device (4) via a network (N), the terminal device (2) saving a first data among the first data and a second data in association with an identification information, and uploading the second data and the identification information via the network (N), the first data and the second data being obtained by partitioning a binary data, the identification information being capable of identifying the first data and the second data, and the data recovery device (4) recovering the binary data from the first data and the second data, and saves the second data and the identification information uploaded from the terminal device (2) in association with each other, wherein the data recovery method comprises the steps of:

detecting the second data corresponding to the identification information from the storage unit (52) in response to receiving the identification information transmitted from the data recovery device (4) acquiring the first data and the identification information from the terminal device (2) via the network (N); and transmitting the detected second data to the data recovery device (4) via the network (N), thereby allowing the data recovery device (4) to recover the binary data.

A data recovery method according to a sixth aspect of the present invention is executed by a data management system (1) comprising: a data management server (5) including a storage unit (52) which is connected to a terminal device (2) via a network (N), the terminal device (2) saving a first data among the first data and a second data in association with an identification information, and uploading the second data and the identification information via the network (N), the first data and the second data being obtained by partitioning a binary data, the identification information being capable of identifying the first data and the second data, and stores the second data and the identification information uploaded from the terminal device (2) in association with each other, and a data recovery device (4) which is connected to the data management server (5) via the network (N) and recovers the binary data from the first data and the second data, wherein the data management server (5) detects the second data corresponding to the identification information from the storage unit (52) in response to receiving the identification information transmitted from the data recovery device (4) via the network (N), wherein the data management server (5) transmits the detected second data to the data recovery device (4) via the network (N), wherein the data recovery device (4) acquires the first data and the identification information from the terminal device (2), and transmits the identification information to the data management server (5) via the network (N), and wherein the data recovery device (4) recovers the binary data from the received second data and the first data acquired from the terminal device (2) in response to receiving the second data corresponding to the identification information transmitted from the data management server (5) via the network (N).

A program according to a seventh aspect of the present invention makes a computer to execute commands of:

acquiring a first data from a terminal device (2) which saves the first data among the first data and a second data and uploads the second data to a data management server (5) via a network (N), the first data and the second data being obtained by partitioning a binary data;

acquiring the second data corresponding to the acquired first data from the data management server (5) via the network (N); and recovering the binary data from the acquired first data and second data.

A program according to an eighth aspect of the present invention makes a computer of a date management server (5) to execute commands, wherein the data management server (5) comprises a storage unit (52) which is connected to a terminal device (2) and a data recovery device (4) via a network (N) and saves a second data and an identification information uploaded from the terminal device (2) in association with each other, the terminal device (2) saving the first data among the first data and the second data in association with the identification information, the first data and the second data being obtained by partitioning a binary data, the identification information being capable of identifying the first data and the second data, the terminal device (2) uploading the second data and the identification information via the network (N), and the data recovery device (4) recovering the binary data from the first data and the second data, wherein the commands comprise:

detecting the second data corresponding to the identification information from the storage unit (52) in response to receiving the identification information transmitted via the network (N), from the data recovery device (4) acquiring the first data and the identification information from the terminal device (2); and transmitting the detected second data to the data recovery device (4) via the network (N), thereby allowing the data recovery device (4) to recovery the binary data.

Effect of the Invention

According to the present invention, there can be provided a data recovery device, a data management server, a data management system, a data recovery method and a program which can prevent data from leaking.

DESCRIPTION OF EMBODIMENTS

A description will be given below of a best mode for carrying out the present invention.

First, a description will be given of a configuration of a data management system according to an embodiment of the present invention with reference to the accompanying drawings.

The data management system according to the present embodiment is adapted to allow a staff to properly conduct an identity confirmation of a user in a teller window of a financial institution, for example, a bank.

Figure 1:
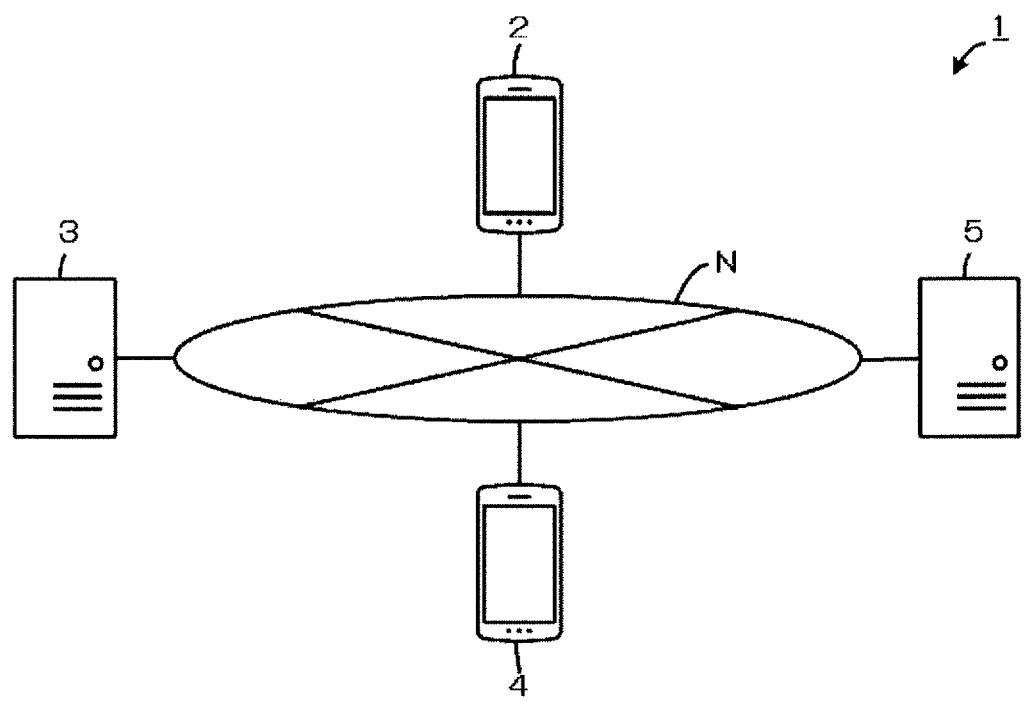
FIG. 1 is a view showing a configuration example of a data management system.

FIG. 1 is a view showing a configuration example of a data management system.

As shown in FIG. 1, a data management system 1 is provided with a terminal device 2, a data code generation server 3, a data recovery device 4, and a data management server 5, which are connected so as to be communicable each other via a network N such as an internet.

The terminal device 2 is configured, for example, by a general-purpose smartphone. The terminal device 2 is adapted to be carried by a user utilizing a service of the financial institution.

Figure 2:
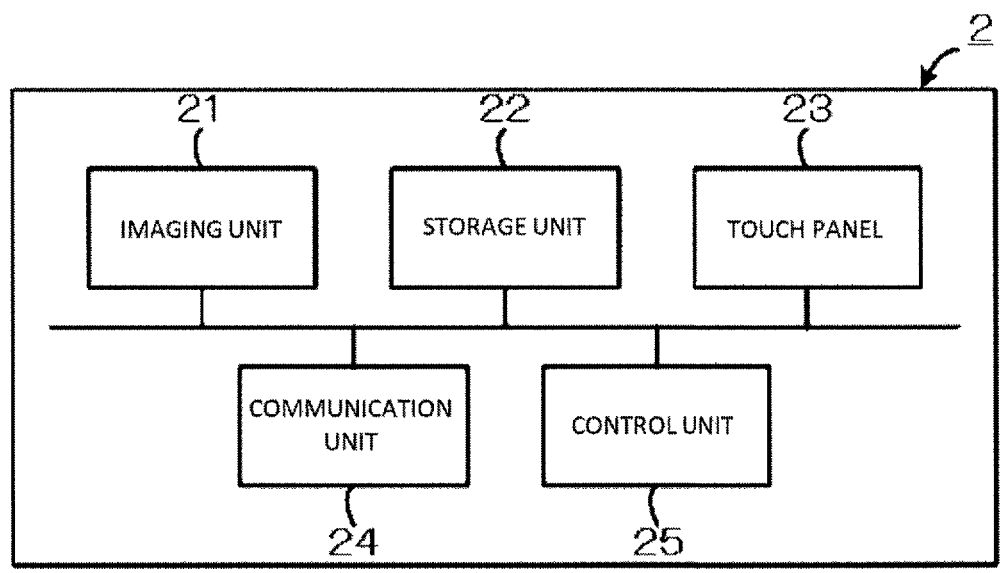
FIG. 2 is a block diagram showing a configuration example of a terminal device.

FIG. 2 is a block diagram showing a configuration example of the terminal device.

As shown in FIG. 2, the terminal device 2 is provided with an imaging unit 21, a storage unit 22, a touch panel 23, a communication unit 24, and a control unit 25, which are connected via a bus.

The imaging unit 21 is configured to include a light receiving element such as a charge coupled device (CCD). The imaging unit 21 images, for example, an ID card such as a driver's license having a face photo of a user attached thereto.

The storage unit 22 is configured, for example, by a non-volatile memory such as a general-purpose flash memory. A dedicated application program (hereinafter, refer to as "dedicated app") is previously installed in the storage unit 22, the dedicated app being provided for uploading a partial data of an image data of the ID card obtained by imaging with the imaging unit 21 to the data management server 5. Further, the storage unit 22 saves the other remaining data (first data) than an incomplete data among the image data of the ID card in association with an imaging time and date of the ID card and a location information of an imaging location.

The touch panel 23 shown in FIG. 2 is configured, for example, by a general-purpose touch panel obtained by combining a liquid crystal display device and a pointing device. The touch panel 23 displays various screens and accepts various operations applied by a user. A top screen of a dedicated app, an imaging screen for imaging the ID card and a data code indicating a remaining data are displayed on the touch panel 23.

Figure 3A:
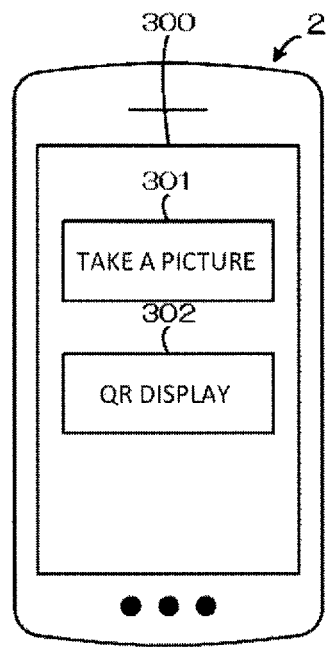
FIG. 3A is a view showing a display example of a top screen.
Figure 3B:
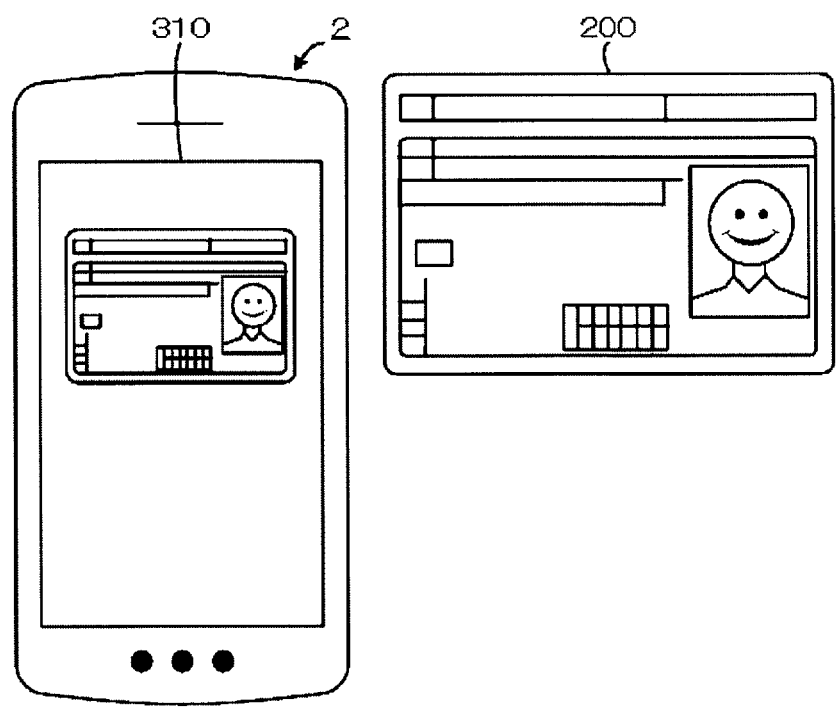
FIG. 3B is a view showing a display example of an imaging screen.

FIG. 3A is a view showing a display example of the top screen, and FIG. 3B is a view showing a display example of the imaging screen.

As shown in FIG. 3A, on a top screen 300, there are displayed an imaging screen display instruction icon (icon indicated by "photographing" in the example shown in FIG. 3A) 301 for instructing a display of the imaging screen, and a data code display instruction icon (icon indicated by "QR display" in the example shown in FIG. 3A) 302 indicating a display of the data code.

When the user taps the imaging display instruction icon 301 on the top screen 300, an imaging screen 310 shown in FIG. 3B is displayed on the touch panel 23. As shown in FIG. 3B, a through-the-lens image of the ID card 200 of the user is displayed on the imaging screen 310. In the meantime, when the user taps the data code display instruction icon 302 on the top screen 300 shown in FIG. 3A, the data code indicating the remaining data is displayed on the touch panel 23.

Figure 4:
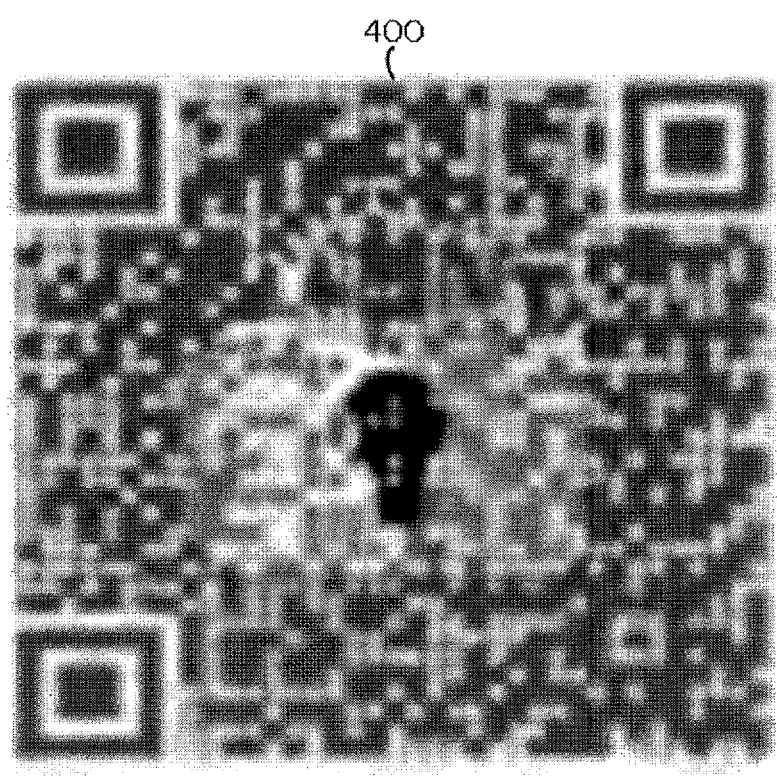
FIG. 4 is a view exemplifying a data code.

FIG. 4 is a view exemplifying the data code.

As shown in FIG. 4, a data code 400 is configured by a two-dimensional code with logo obtained by superimposing a two-dimensional code, for example, a QR (quick response) code (registered trademark) on a viewable logo image (for example, refer to Japanese Unexamined Patent Publication No. 2007-287004, Japanese Unexamined Patent Publication No. 2008-15642 and WO2011/118540). The descriptions, claims and drawings of Japanese Unexamined Patent Publication No. 2007-287004, Japanese Unexamined Patent Publication No. 2008-15642 and WO2011/118540 are incorporated in the present application as a whole for reference.

The communication unit 24 shown in FIG. 2 is configured, for example, by a wireless communication device having a global positioning system (GPS) function. The communication unit 24 acquires a current time from a network time protocol (NTP) server (not shown) via the network N. A method of acquiring the current time is not limited to the acquirement from an NTP server, but may be arbitrarily based on acquirement from a global navigation satellite system (GNSS) or acquirement from a carrier. Further, the communication unit 24 acquires a current location information of the terminal device 2 from a GPS satellite (not shown) via a GPS antenna (not shown).

In the present embodiment, the current time (for example, H1H2 hour, M1M2 minute, S1S2 second, M1M2 month, D1D2 day, Y1Y2Y3Y4 year) acquired from the NTP server (not shown) is expressed by fourteen digits of digit sequence (Y1Y2Y3Y4M1M2D1D2H1H2M1M2S1S2). The current time may be nineteen digits of digit sequence obtained by adding five digits of digit sequence (+0900) indicating Japan Standard Time; JST to the above-described fourteen digits of digit sequence. Further, the current location information of the terminal device 2 acquired from the GPS satellite (not shown) is expressed by eighteen digits of digit sequence indicating a GPS coordinate. For example, a GPS coordinate (35.666561, 139.770631) is expressed by "035666561139770631", and a GPS coordinate (−83.592081, 40.320575) is expressed by "−83592081040320575".

Further, the communication unit 24 transmits a current time acquired as an imaging time and date from the NTP server (not shown) and a current location information of the terminal device 2 acquired as a location information of the imaging location from the GPS satellite (not shown) along with the incomplete data (second data) of the ID card 200 to the data management server 5 via the network N. Further, the communication unit 24 transmits a data code generation request requesting generation of a data code 400 to the data code generation server 3 via the network N. Further, the communication unit 24 receives the data code 400 transmitted from the data code generation server 3 via the network N.

The control unit 25 is configured, for example, by a central processing unit (CPU), a read only memory (ROM) and a random access memory (RAM). The CPU employs the RAM as a working memory, and controls various behaviors of the terminal device 2 by appropriately executing programs stored in the ROM and the storage unit 22.

In the present embodiment, the control unit 25 displays a top screen 300 shown in FIG. 3A on the touch panel 23 by executing the dedicated app stored in the storage unit 22. The control unit 25 displays an imaging screen 310 shown in FIG. 3B on the touch panel 23 in response to the tapping of the image screen display instruction icon 301 on the top screen 300 by the user.

The control unit 25 images an ID card 200 of the user by the imaging unit in response to an instruction for imaging the ID card 200 of the user displayed as the through-the-lens image on the imaging screen 310 by the user, and acquires an image data (binary data) of the ID card 200. Further, the control unit 25 acquires a current time as an imaging time and date of the ID card 200 from the NTP server (not shown) via the network N in the communication unit 24. Further, the control unit 25 acquires a current location information of the terminal device 2 as a location information of the imaging location from the GPS satellite (not shown) via the GPS antenna (not shown) in the communication unit 24.

Next, the control unit 25 partitions the image data of the ID card 200 into the incomplete data uploaded to the data management server 5, and the remaining data saved in the storage unit 22. More specifically, the control unit 25 partitions the image data of the ID card 200 per one bite and sets one bite of partition data as one piece. Subsequently, the control unit 25 selects pieces left in the terminal device 2, for example, four pieces among about million pieces configuring the image data of the ID card 200. Further, the control unit 25 generates the remaining data of the ID card 200 from the selected four pieces, and generates the incomplete data from the other pieces than four pieces left in the terminal device 2.

The control unit 25 saves the remaining data of the ID card 200 in the storage unit 22 in association with the acquired imaging time and date and the location information of the imaging location. In the meantime, the control unit 25 transmits and uploads the incomplete data of the ID card 200 to the data management server 5 from the communication unit 24 via the network N along with the acquired imaging time and date and the location information of the imaging location.

Thereafter, the control unit 25 transmits the data code generation request including the remaining data of the ID card 200, the imaging time and date and the location information of the imaging location stored in the storage unit 22 to the data code generation server 3 from the communication unit 24 via the network N in response to the tapping of the data code display instruction icon 302 on the top screen 300 shown in FIG. 3A by the user. Further, the control unit 25 receives a data code 400 transmitted from the data code generation server 3 via the network N by the communication unit 24, and displays on the touch panel 23.

The data code generation server 3 shown in FIG. 1 is configured, for example, by a general-purpose server computer. The data code generation server 3 generates the data code 400 indicating the remaining data.

Figure 5:
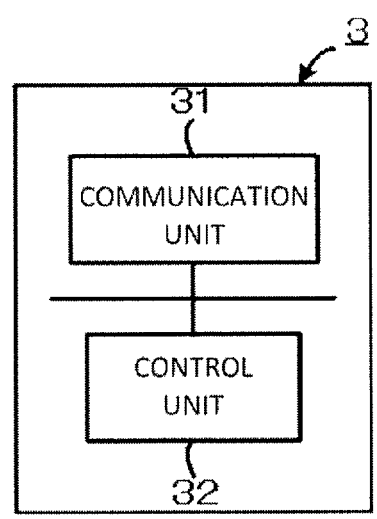
FIG. 5 is a block diagram showing a configuration example of a data code generation server.

FIG. 5 is a block diagram showing a configuration example of the data code generation server.

As shown in FIG. 5, the data code generation server 3 is provided with a communication unit 31 and a control unit 32, which are connected via a bus.

The communication unit 31 is configured, for example, by a network interface card (NIC). The communication unit 31 receives the data code generation request transmitted from the terminal device 2 via the network N. Further, the communication unit 31 acquires the current time from the NTP server (not shown) via the network N. Further, the communication unit 31 transmits the data code 400 to the terminal device 2 via the network N.

The control unit 32 is configured, for example, by the CPU, the ROM and the RAM. The CPU employs the RAM as the working memory, and controls various behaviors of the data code generation server 3 by appropriately executing the programs stores in the ROM and the storage unit (not shown).

In the present embodiment, the control unit 32 acquires the current time as a generation time of the data code 400 in response to the receiving of the data code generation request transmitted from the terminal device 2 via the network N by the communication unit 31. More specifically, the control unit 32 acquires the current time from the NTP server (not shown) via the network N. A method of acquiring the current time is not limited to the acquirement from the NTP server, but may be arbitrarily based on an acquirement from the GNSS or an acquirement from the carrier. Further, the control unit 32 acquires four digits of digit sequence (H1H2M1M2) as the generation time of the data code 400 among the acquired current time (for example, H1H2 hour, M1M2 minute, S1S2 second, M1M2 month, D1D2 day, Y1Y2Y3Y4 year).

Subsequently, the control unit 32 generates the QR code (registered trademark) indicating the remaining data of the ID card 200, the imaging time and date, and the location information of the imaging location which are included in the data code generation request. Further, the control unit 32 generates the data code 400 by embedding a generation time of the data code 400 in a correction area of the QR code (registered trademark) indicating the remaining data of the ID card 200, the imaging time and date, and the location information of the imaging location. A technique of embedding the generation time of the data code 400 in the correction area of the QR code (registered trademark) is in detail described in Japanese Unexamined Patent Publication No. 2013-058965, Japanese Unexamined Patent Publication No. 2014-029659, Japanese Patent No. 6488434, WO2014/

027424 and WO2015/001637. The descriptions, claims and the drawings of Japanese Unexamined Patent Publication No. 2013-058965, Japanese Unexamined Patent Publication No. 2014-029659, Japanese Patent No. 6488434 and WO2014/027424 are incorporated in the present application as a whole for reference.

In particular, the control unit 32 embeds the generation time of the data code 400 in the correction area of the QR code (registered trademark) in such a manner as described below.

Figure 6:
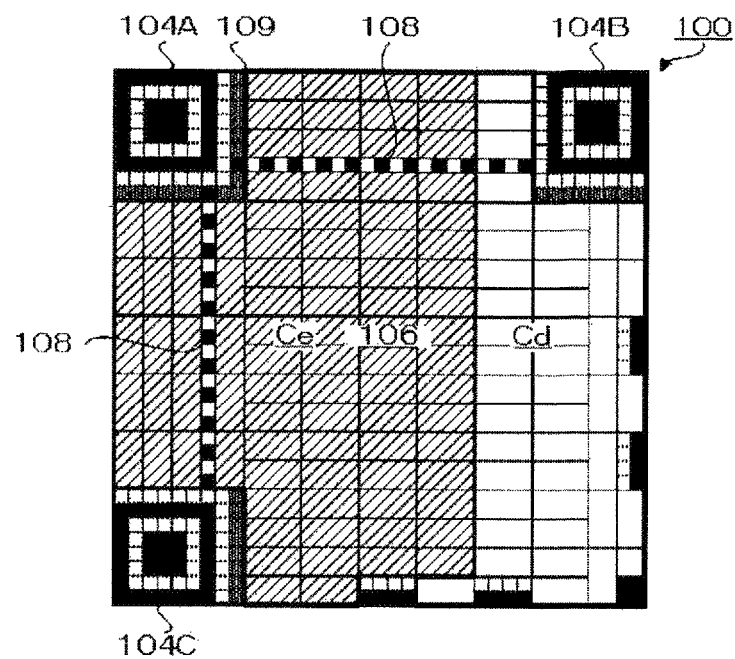
FIG. 6 is a view showing a configuration example of a QR code (registered trademark).

FIG. 6 is a view showing a configuration example of the QR code (registered trademark).

As shown in FIG. 6, a QR code (registered trademark) 100 is provided with three positioning symbols 104A, 104B and 104C, an information code recording area 106, a timing cell 108 and a format code 109. The information code recording area 106 includes a code pair of an information code (information area) Cd, and a Reed-Solomon (RS) code (correction area) Ce corresponding thereto. The information code Cd is formed by coding the remaining data of the ID card 200, the imaging time and date, and the location information of the imaging location, and expresses the remaining data of the ID card 200, the imaging time and date, and the location information of the imaging location by a distribution pattern (cell pattern) of the cells included in the information code Cd. Further, the RS code Ce is formed by coding the information for correction which is formed by coding the remaining data of the ID card 200, the imaging time and date, and the location information of the imaging location with the use of the Read-Solomon (RS), and expresses an information for correction for correcting an error on the basis of the cell pattern included in the RS code Ce. The information code recording area 106 is constituted, for example, by forty four information symbols configuring the information code Cd, and ninety RS symbols configuring the RS code Ce, totally one hundred thirty four symbols. The information code recording area 106 is partitioned into four blocks, among which two blocks are configured by eleven information symbols and twenty two RS symbols corresponding thereto, totally thirty three symbols, and the remaining two blocks are configured by eleven information symbols and twenty three RS symbols corresponding thereto, totally thirty four symbols.

The control unit 32 shown in FIG. 5 decodes each of the blocks of the QR code (registered trademark) having the configuration mentioned above according to a predetermined code placement rule, thereby acquiring an information bit string constituted by eleven information symbols and an RS bit string constituted by twenty two or twenty three RS symbols from each of the blocks. Next, the control unit 32 extracts two RS symbols from a predetermined position of the RS bit string in each of the blocks, and acquires a bit string (embedded bit string) mi (i=1 to 4) of a bit length 16 constituted by two RS symbols from each of the blocks. Subsequently, the control unit 32 calculates an exclusive OR of the bit string mi (i=1 to 4) and a bit string (authentication bit string) ni (i=1 to 4) of the bit length 16 indicating each of 4 digit numbers configuring the generation time of the data code 400, and generates a bit string m'i (i=1 to 4) (first exclusive OR).

Figure 7:
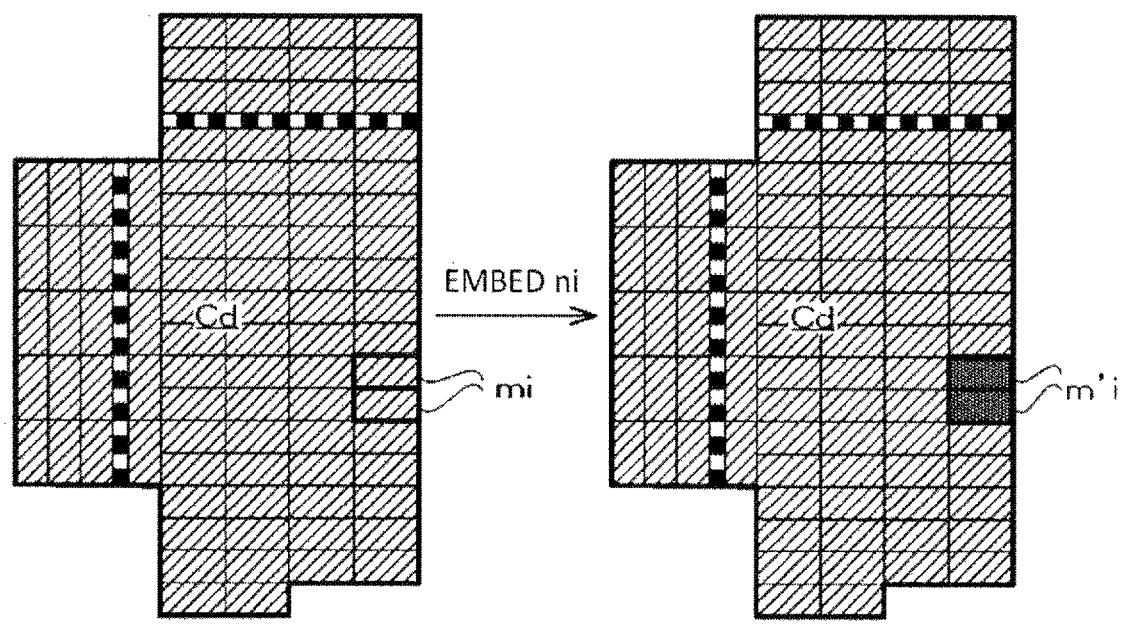
FIG. 7 is a schematic view for describing an embedding procedure of a generation time of a data code.

FIG. 7 is a schematic view for describing an embedding procedure of the generation time of the data code.

The control unit 32 embeds the bit string ni (i=1 to 4) as the generation time of the data code 400 by replacing the bit string mi (i=1 to 4) with a bit string m'i (i=1 to 4), respectively as shown on the left-hand and right-hand sides of FIG. 7.

The control unit 32 shown in FIG. 5 generates a QR code (registered trademark) in which the authentication information is embedded in the correction area, by arranging the information bit string, and the RS bit string in which the generation time is embedded, according to a code placement rule of the QR code (registered trademark). Subsequently, the control unit 32 generates the data code (two-dimensional code with logo) 400 by superimposing the QR code (registered trademark) in which the generation time is embedded in the correction area, on the viewable logo image. Further, the control unit 32 transmits the generated data code 400 from the communication unit 31 to the terminal device 2 via the network N.

The data recovery device 4 shown in FIG. 1 is configured, for example, by a QR code (registered trademark) reader having a communication function, or a smartphone or a tablet computer having a QR code (registered trademark) reading function. The date recovery device 4 is used, for example, when the staff in the financial institution reads the data code 400 which is displayed on the touch panel 23 of the terminal device 2. The data recovery device 4 may be adapted to be installed in the financial institution. In this case, the user may hold the data code 400 displayed on the touch panel 23 of the terminal device 2 over the data recovery device 4 for reading.

Figure 8:
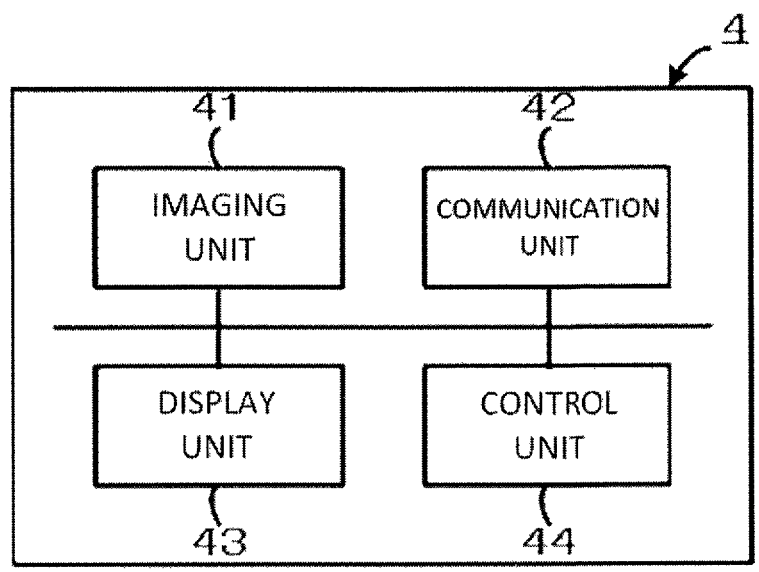
FIG. 8 is a block diagram showing a configuration example of a data recovery device.

FIG. 8 is a block diagram showing a configuration example of the data recovery device.

As shown in FIG. 8, the data recovery device 4 is provided with an imaging unit 41, a communication unit 42, a display unit 43, and a control unit 44, which are connected via the bus.

The imaging unit 41 is configured to include a light receiving element such as CCD. The imaging unit 41 images the data code 400 which is displayed on the touch panel 23 of the terminal device 2.

The communication unit 42 is configured, for example, by a general-purpose wireless communication device. The communication unit 42 transmits an incomplete data transmission request requesting the transmission of the incomplete data to the data management server 5 via the network N. Further, the communication unit 42 receives the incomplete data transmitted from the data management server 5 via the network N.

The display unit 43 is configured, for example, by a general-purpose liquid crystal display instrument. The display unit 43 displays various screens. An image data of the ID card 200 of the user is displayed on the display unit 43.

The control unit 44 is configured, for example, by the CPU, the ROM and the RAM. The CPU employs the RAM as the working memory, and controls the various behaviors of the data recovery device 4 by appropriately executing the programs stored in the ROM or the storage unit (not shown).

In the present embodiment, the control unit 44 images the data code 400 displayed on the touch panel 23 of the terminal device 2 by the imaging unit 41 in response to the instruction of reading the data code 400 by the staff in the financial institution. The control unit 44 acquires the information bit string constituted by eleven information symbols and the RS bit string constituted by twenty two or twenty three RS symbols from each of the blocks of the QR code (registered trademark), by decoding the image bit string obtained by imaging the data code 400 by the imaging unit 41 according to the code placement rule mentioned above. Next, the control unit 44 detects four bit strings m'i (i=1 to 4) (first exclusive OR) constituted by two RS symbols as an error, by determining an exclusive OR (second exclusive OR) of the image bit string, the information bit string and the RS bit string. Subsequently, the control unit 44 acquires four bit strings ni (i=1 to 4) embedded as the generation time of the data code 400, by calculating an exclusive OR of four bit strings mi (i=1 to 4) included in the RS bit string, and four bit strings m'i (i=1 to 4) detected as the error.

The control unit 44 transmits the incomplete data transmission request including the generation time of the data code 400 constituted by four bit strings ni (i=1 to 4) acquired from the correction area of the data code 400, and the imaging time and data of the ID card 200 and the location information of the imaging location which are shown by the data code 400, from the communication unit 42 to the data management server 5 via the network N.

The control unit 44 recovers the image data of the ID card of the user from the received incomplete data, and the remaining date shown by the data code 400, in response to the receiving of the incomplete data transmitted from the data management server 5 via the network N by the communication unit 42. Further, the control unit 44 displays the ID card 200 of the user on the display unit 43 on the basis of the recovered image data.

In the meantime, the control unit 44 displays on the display unit 43 a recovery impossible screen indicating that the image data of the ID card 200 of the user can not be recovered, in response to the receiving of the incomplete data transmission impossible report transmitted from the data management server 5 via the network N by the communication unit 42.

The data management server 5 shown in FIG. 1 is configured, for example, by a general-purpose server computer and a general-purpose database. The data management server 5 saves and transmits the incomplete data.

Figure 9:
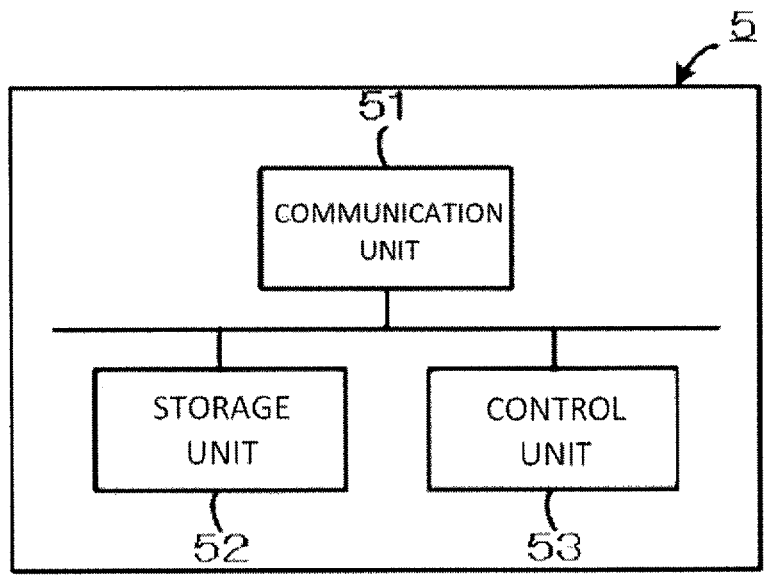
FIG. 9 is a block diagram showing a configuration example of a data management server.

FIG. 9 is a block diagram showing a configuration example of the data management server.

As shown in FIG. 9, the data management server 5 is provided with a communication unit 51, a storage unit 52, and a control unit 53, which are connected via the bus.

The communication unit 51 is configured, for example, by the NIC. The communication unit 51 receives the incomplete data of the ID card 200, the imaging time and date, and the location information of the imaging location which are transmitted from the terminal device 2 via the network N. Further, the communication unit 51 receives the incomplete data transmission request transmitted from the data recovery device 4 via the network N. Further, the communication unit 51 transmits the incomplete data of the ID card 200 to the data recovery device 4 via the network N.

The storage unit 52 is configured, for example, by a hard disc drive. The storage unit 52 saves the incomplete data of the ID card 200, the imaging time and data, and the location information of the imaging location in association with each other.

The control unit 53 is configured, for example, by the CPU, the ROM and the RAM. The CPU employs the RAM as the working memory, and controls various behaviors of the data management server 5 by appropriately executing the programs stored in the ROM and the storage unit 52.

In the present embodiment, the control unit 53 receives the incomplete data of the ID card 200, the imaging time and date, and the location information of the imaging location which are transmitted from the terminal device 2 via the network N by the communication unit 51, and saves them in the storage unit 52 in association with each other.

Thereafter, the control unit 53 discriminates whether or not it is within a prescribed time period (for example, ten minutes) from the generation time of the data code 400 included in the incomplete data transmission request, in response to the receiving of the incomplete data transmission request transmitted from the data recovery device 4 via the network N by the communication unit 51.

In a case where it is within the prescribed time period from the generation time of the data code 400, the control unit 53 discriminates whether or not the incomplete data corresponding to the imaging time and date of the ID card 200 and the location information of the imaging location included in the incomplete data transmission request are saved in the storage unit 52.

In a case where the incomplete data is saved in the storage unit 42, the control unit 53 transmits the incomplete data to the data recovery device 4 from the communication unit 51 via the network N.

In the meantime, in a case where the prescribed time period or more has elapsed from the generation time of the data code 400, or in a case where the incomplete data is not saved in the storage unit 52, the control unit 53 determines that the authentication is failed, and transmits the transmission impossible report indicating that the incomplete data can not be transmitted, to the data recovery device 4 from the communication unit 51 via the network N.

Next, a description will be given of various processing executed by the data management system 1 having the configuration mentioned above with reference to the accompanying drawings.

The data management system 1 starts an image data distributed processing in response to the instruction of imaging the ID card 200 of the user which is displayed as the through-the-lens image in the imaging screen 310 shown in FIG. 3B.

Figure 10:
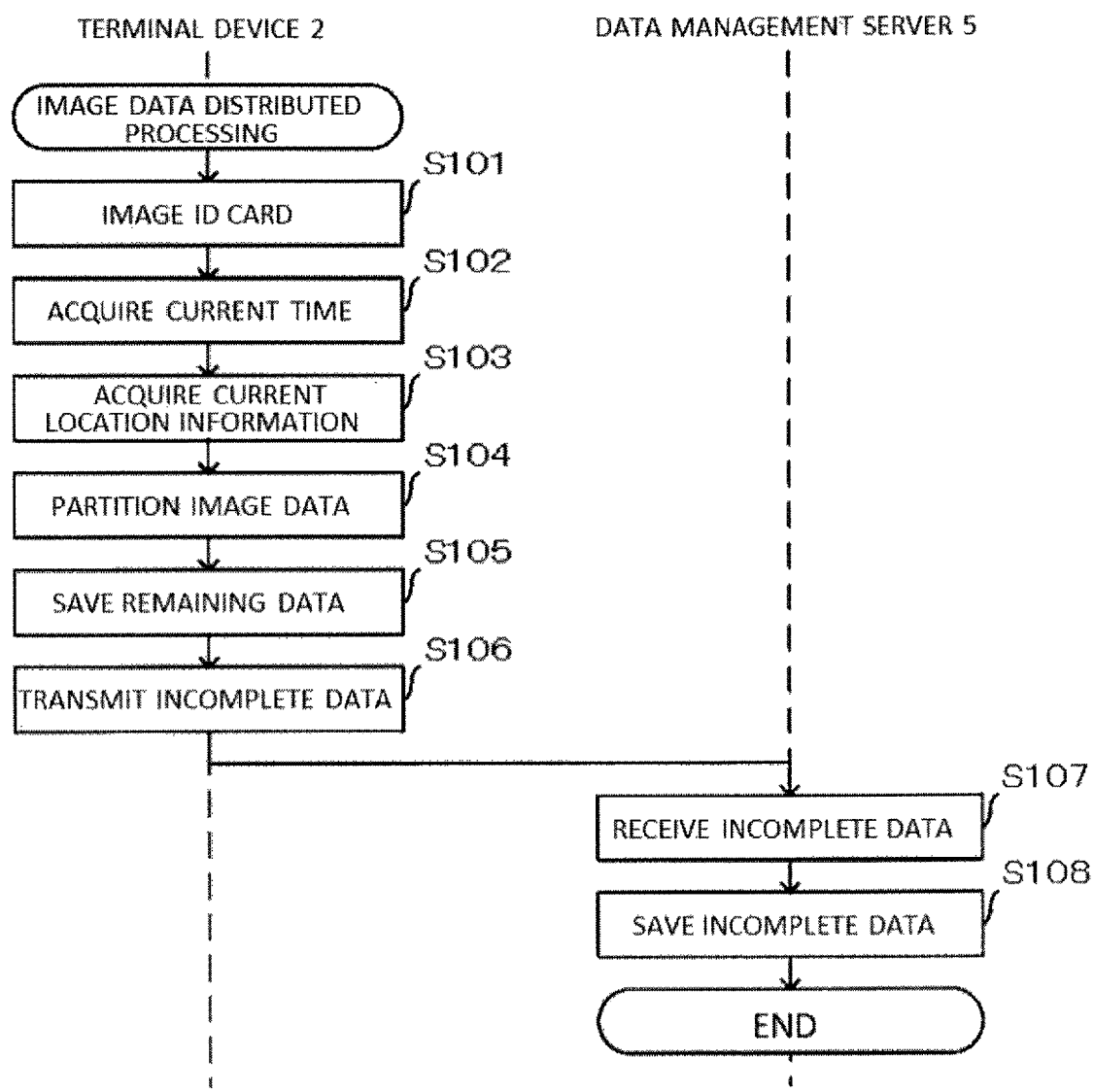
FIG. 10 is a flow chart showing a detail of an image data distributed processing.

FIG. 10 is a flow chart showing a detail of the image data distributed processing.

In the image date distributed processing shown in FIG. 10, the control unit 25 of the terminal device 2 first images the ID card 200 of the user by the imaging unit 21, and acquires the image data (binary data) of the ID card 200 (step S101).

Further, the control unit 25 acquires the current time as the imaging time and date of the ID card 200 by the communication unit 24 from the NTP server (not shown) via the network N (step S102).

Further, the control unit 25 acquires the current location information of the terminal device 2 as the location information of the imaging location by the communication unit 24 from the GPS satellite via the GPS antenna (not shown) (step S103).

Next, the control unit 25 partitions the image data of the ID card 200 acquired in the step S101 into the incomplete data which is uploaded to the data management server 5, and the remaining data which is saved in the storage unit 22 (step S104).

The control unit 25 saves the remaining data of the ID card 200 acquired in the step S104 in the storage unit 22 in association with the imaging time and date and the location information of the imaging location which are acquired in the steps S102 and S103 (step S105).

In the meantime, the control unit 25 transmits and uploads the incomplete data of the ID card 200 acquired in the step S104 along with the imaging time and date and the location information of the imaging location which are acquired in the steps S102 and S103, to the data management server 5 from the communication unit 24 via the network N (step S106).

The control unit 53 of the data management server 5 receives the incomplete data of the ID card 200, the imaging time and date, and the location information of the imaging location which are transmitted from the terminal device 2 via the network N, by the communication unit 51 (step S107).

Further, the control unit 53 saves the incomplete data of the ID card 200, the imaging time and date, and the location information of the imaging location which are received in the step S107, in the storage unit 52 in association with each other (step S108), and then finishes the image data distributed processing.

Thereafter, the data management system 1 starts the data code generation processing in response to the tapping of the data code display instruction icon 302 on the top screen 300 shown in FIG. 3A by the user.

Figure 11:
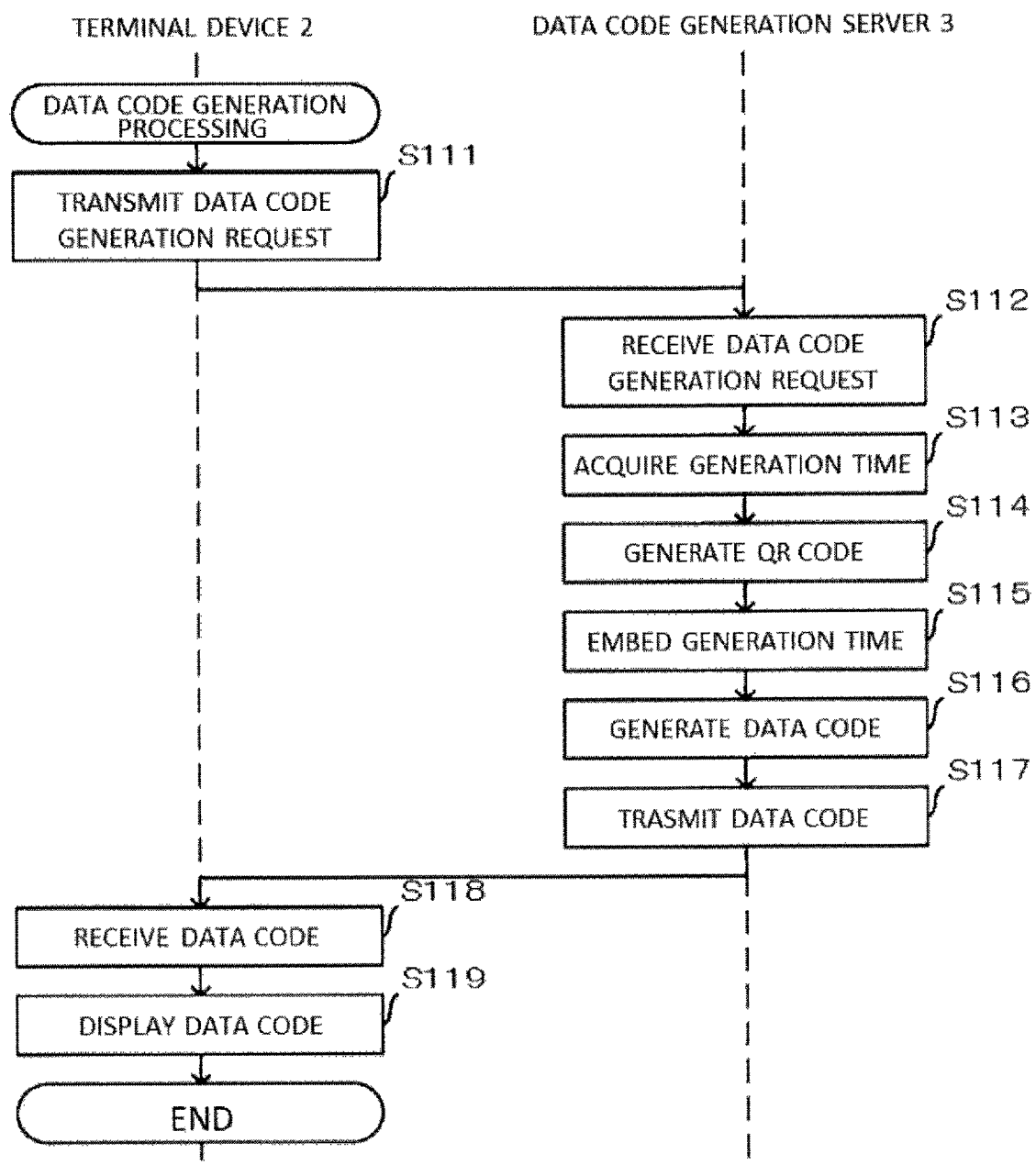
FIG. 11 is a flow chart showing a detail of a data code generation processing.

FIG. 11 is a flow chart showing a detail of the data code generation processing.

In the data code generation processing shown in FIG. 11, the control unit 25 of the terminal device 2 first transmits the data code generation request including the remaining data of the ID card 200, the imaging time and date, and the location information of the imaging location which are stored in the storage unit 22, to the data code generation server 3 from the communication unit 24 via the network N (step S111).

The control unit 32 of the data code generation server 3 acquires the current time as the generation time of the data code 400 (step S113), in response to the receiving of the data code generation request transmitted from the terminal device 2 via the network N by the communication unit 31 (step S112).

Next, the control unit 32 generates the QR code (registered trademark) indicating the remaining data of the ID card 200, the imaging time and date, and the location information of the imaging location which are included in the data code generation request (step S114).

Next, the control unit 32 embeds the generation time acquired in the step S113 in the correction area of the QR code (registered trademark) generated in the step S114 (step S115).

Subsequently, the control unit 32 generates the data code (two-dimensional code with logo) 400 by superimposing the QR code (registered trademark) in which the generation time is embedded in the correction area, on the viewable logo image (step S116).

Further, the control unit 32 transmits the data code 400 generated in the step S116 to the terminal device 2 from the communication unit 31 via the network N (step S117).

The control unit 25 of the terminal device 2 receives the data code 400 transmitted from the data code generation server 3 via the network N by the communication unit 24 (step S118).

Further, the control unit 25 displays the data code 400 received in the step S118 on the touch panel 23 (step S119), and then finishes the data code generation processing.

Thereafter, the user presents the terminal device 2 in which the data code 400 is displayed on the touch panel 23 to the staff in the financial institution, at the teller window of the financial institution. Further, in response to the staff in the financial institution holding the imaging unit 41 of the data recovery device 4 over the data code 400 displayed on the touch panel 23 of the terminal device 2, and instructing the reading of the data code 400, the data management system 1 executes the image data recovery processing.

Figure 12:
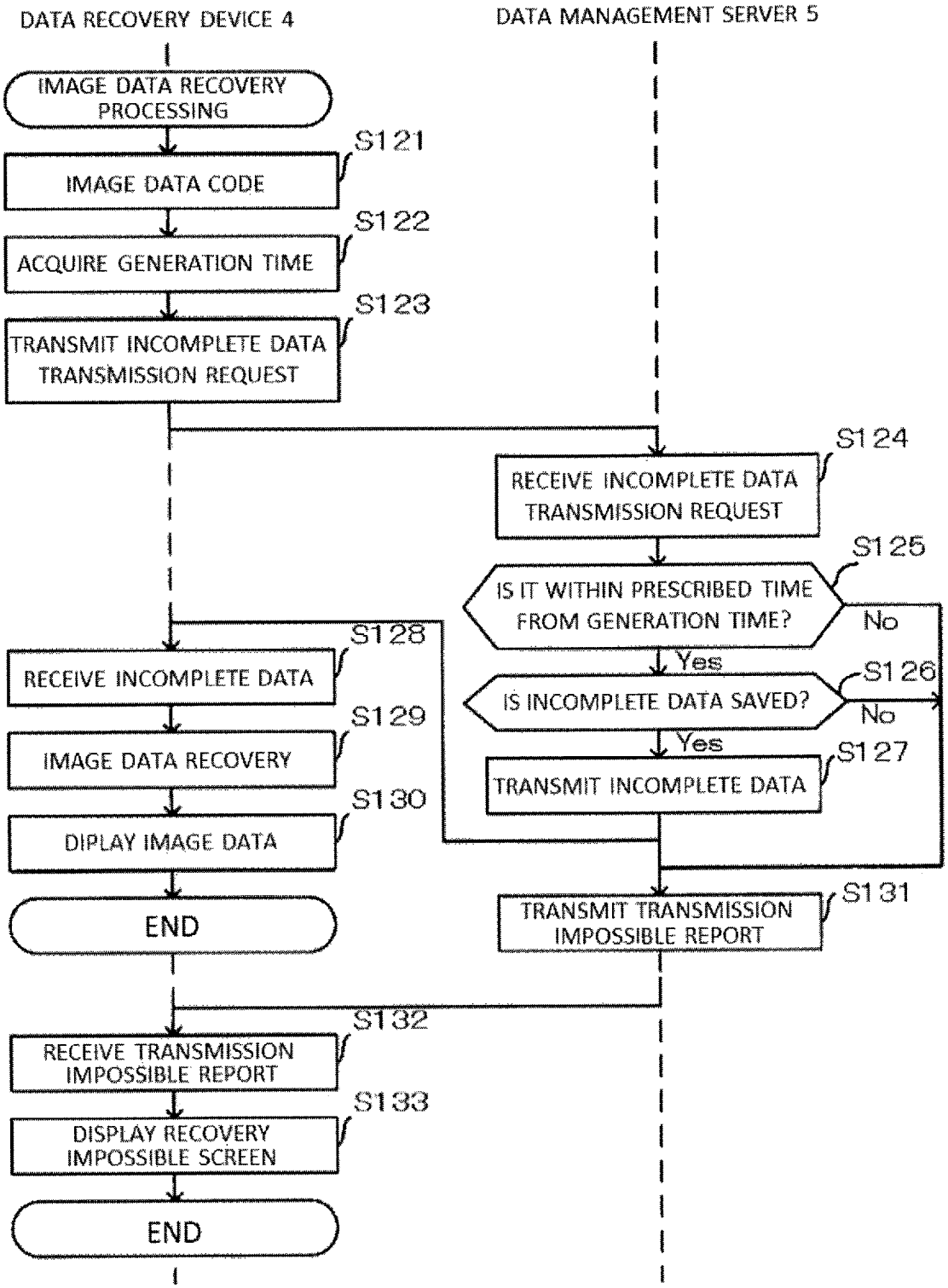
FIG. 12 is a flow chart showing a detail of an image data recovery processing.

FIG. 12 is a flow chart showing a detail of the image data recovery processing.

In the image data recovery processing show in FIG. 12, the control unit 44 of the data recovery device 4 first images the data code 400 displayed on the tough panel 23 of the terminal device 2 by the imaging unit 41 (step S121).

Next, the control unit 44 acquires the generation time embedded in the correction area of the data code 400 imaged in the step S121 (step S122).

Subsequently, the control unit 44 transmits the incomplete data transmission request including the generation time of the data code 400 which is acquired in the step S122, and the imaging time and date of the ID card 200 and the location information of the imaging location which are indicated by the data code 400, to the data management server 5 from the communication unit 42 via the network N (step S123).

The control unit 53 of the data management server 5 discriminates whether or not it is within a prescribed time period (for example, ten minutes) from the generation time of the data code 400 included in the incomplete data transmission request (step S125), in response to the receiving of the incomplete data transmission request transmitted from the data recovery device 4 via the network N by the communication unit 51 (step S124).

In a case where it is within the prescribed time period from the generation time of the data code 400 (step S125: Yes), the control unit 53 discriminates whether or not the incomplete data corresponding to the imaging time and date of the ID card 200 and the location information of the imaging location included in the incomplete data transmission request are saved in the storage unit 52 (step S126).

In a case where the incomplete data is saved in the storage unit 42 (step S126: Yes), the control unit 53 transmits the incomplete data to the data recovery device 4 from the communication unit 51 via the network N (step S127).

The control unit 44 of the data recovery device 4 recovers the image data of the ID card 200 of the user from the incomplete data received in the step S128 and the remaining data shown by the data code 400 (step S129), in response to the receiving of the incomplete data transmitted from the data management server 5 via the network N by the communication unit 42 (step S128).

Further, the control unit 44 displays the ID card 200 of the user on the display unit 43 on the basis of the image data recovered in the step S129 (step S130), and then finishes the image data recovery processing.

The staff of the financial institution can execute the identify confirmation of the user on the basis of a face image which is attached to the ID card 200 displayed on the display unit 43.

In the meantime, in a case where the prescribed time period or more has elapsed from the generation time of the data code 400 (step S125; No), or in a case where the incomplete data is not saved in the storage unit 52 (step s126; No), the control unit 53 of the data management server 5 determines that the authentication is failed, and transmits the transmission impossible report indicating that the incomplete data can not be transmitted, to the data recovery device 4 from the communication unit 51 via the network N (step S131).

In response to the receiving of the transmission impossible report transmitted from the data management server 5 via the network N by the communication unit 42 (step S132), the control unit 44 of the data recovery device 4 displays on the display unit 43 the recovery impossible screen indicating that the image data in the ID card 200 of the user can not be recovered (step S133), and then finishes the image data recovery processing.

As described above, the data management system 1 according to the present embodiment is provided with the terminal device 2, the data recovery device 4, and the data management server 5, which are connected via the network N.

The terminal device 2 saves the remaining data among the remaining data and the incomplete data which are acquired by partitioning the image data (binary data) of the ID card of the user, in the storage unit 22, in association with the imaging time and date of the ID card and the location information of the imaging location which can identify the remaining data and the incomplete data. In the meantime, the terminal device 2 uploads the incomplete data of the ID card, the imaging time and data, and the location information of the imaging location to the data management server 5 via the network N. The terminal device 2 displays the data code 400 indicating the remaining data of the ID card, the imaging time and date, and the location information of the imaging location on the data code 400. The generation time is embedded in the data code 400.

The data recovery device 4 acquires the remaining data of the ID card, the imaging time and date, and the location information of the imaging location which are indicated by the data code 400 displayed in the terminal device 2. Further, the data recovery device 4 acquires the generation time from the data code 400. Further, the data recovery device 4 transmits the incomplete data transmission request including the imaging time and date of the ID card, the location information of the imaging location, and the generation time of the data code 400 to the data management server 5 via the network N.

The control unit 53 of the data management server 5 discriminates from the generation time of the data code 400 included in the incomplete data transmission request whether or not it is within a prescribed time period, in response to the receiving of the incomplete data transmission request transmitted from the data recovery device 4 via the network N. Further, the control unit 53 detects the incomplete data corresponding to the imaging time and date of the ID card and the location information of the imaging location which are included in the incomplete data transmission request, from the storage unit 52 under the condition of being within the prescribed time period, and transmits the detected incomplete data to the data recovery device 4 via the network N.

The data recovery device 4 recovers the image data of the ID card from the received incomplete data and the remaining data acquired from the terminal device 2, in response to the receiving of the incomplete data which is transmitted from the data management server 5 via the network N.

As described above, in the data management system 1 according to the present embodiment, only the incomplete data of the image data (binary data) of the ID card is uploaded to the data management server 5 via the network N. In the meantime, the remaining data is not uploaded but is kept being held in the terminal device 2. Further, the data recovery device 4 can acquire the incomplete data from the data management server 5 by transmitting only the imaging time and date of the ID card and the location information of the imaging location without transmitting the remaining data to the data management server 5 via the network N, when recovering the image data of the ID card. More specifically, in the data management system 1, all the image data of the ID card is not transmitted and received via the network N, and all the image data of the ID card is not saved in the data management server 5. As a result, even if the cracking is applied to the data management system 1 according to the present embodiment, only the incomplete data having the remaining data lacked leaks, and the image data of the ID card can not be recovered only from the incomplete data. Therefore, the data management system 1 can prevent the data from leaking. As a result, the user can execute the identify confirmation at the teller window in the financial institution by utilizing the terminal device 2 without worrying about the leakage of the individual information described in the ID card.

Further, the data recovery device 4 can not acquire the incomplete data from the data management server 5 unless the data recovery device 4 transmits the incomplete data transmission request to the data management server 5 within the prescribed time period from the generation time of the data code 400. Therefore, even if the data code 400 displayed in the terminal device 2 is taken a photo without permission, it is possible to prevent the data code from being improperly used as much as possible by the elapse of the prescribed time period.

Further, since the data leakage can be prevented without encrypting the data in the data management system 1, it is not necessary to take measure on the assumption of leakage of a release key for releasing a code language. Further, since the encrypting is not executed, an inordinate burden is not required for the data management server 5 due to the increase of the data length.

The present invention is not limited to the embodiment mentioned above, but can be variously modified and applied. A description will be given below of modified aspects of the embodiment mentioned above which can be applied to the present invention.

In the embodiment mentioned above, the description is given on the assumption that the binary data is the image data of the ID card such as the driver's license. However, the present invention is not limited to this, but the binary data may be arbitrary data as long as the data is processed by a computer, for example, text data, voice data and video data may be employed. Further, the image data is not limited to the data indicating the driver's license, but may be data indicating the other ID card such as an individual number card. Further, it may be data indicating the other than the ID card, for example, a seal, a face photo of a user, a bill, a check, a local money, a drawing for design, a literary work and a crime prevention video.

In the embodiment mentioned above, the description is given on the assumption that the data code 400 is generated by the data code generation server 3. However, the present invention is not limited to this, but the data code 400 may be generated by the terminal device 2.

In the embodiment mentioned above, the description is given on the assumption that the data code 400 is the two-dimensional code with logo in which the QR code (registered trademark) is superimposed on the viewable logo image. However, the present invention is not limited to this, but the data code 400 may be a general-purpose QR code (registered trademark) constituted by white cells and black cells on which the logo image is not superimposed. Further, the data code 400 may be the other than the QR code (registered trademark), for example, the other matrix type two-dimensional code such as data matrix, Aztek code, Code One, Array tag, Box figure code, Maxi Code, Peri code, Soft strip, CP code, Carla code, and Ultra cord. Alternatively, it may be a stack type two-dimensional code obtained by vertically stacking one-dimensional bar codes such as PDF 417, code 49, code 16k and coder block. Further, the data code 400 may be a one-dimensional code such as a bar code.

In the embodiment mentioned above, the description is given on the assumption that the data recovery device 4 acquires the remaining data indicated by the data code 400 by imaging the data code 400 displayed on the touch panel 23 of the terminal device 2 by the imaging unit 41. However, the present invention is not limited to this, but a method of acquiring the remaining data by the data recovery device 4 is voluntarily selected. For example, the remaining data may be transmitted to the data recovery device 4 from the terminal device 2 by using the Bluetooth (registered trademark) function.

In the embodiment mentioned above, the description is given on the assumption that the remaining data and the incomplete data of the ID card are saved in the storage units 22 and 52 respectively without being encrypted. Further, the description is given on the assumption that the remaining data indicated by the data code 400 is not encrypted. However, the present invention is not limited to this, but the remaining data and the incomplete data of the ID card may be encrypted and saved in the storage units 22 and 52 respectively, and the remaining data indicated by the data code 400 may be encrypted.

In the embodiment mentioned above, the imaging time of the ID card and the location information of the imaging location are exemplified as the identification information which can identify the remaining data and the incomplete data of the ID card. However, the present invention is not limited to this, but the identification information which can identify the remaining data and the incomplete data of the ID card is voluntarily selected. For example, it may be the identification information of the terminal device 2 or the user imaging the ID card, and a model name of the terminal device 2 may be included.

Further, in the embodiment mentioned above, the description is given on the assumption that the program executed by the CPUs of the control units 25, 32, 44 and 53 is previously stored in the ROM and the storage units 22 and 52. However, the present invention is not limited to this, but a program for executing the processing mentioned above may be functioned as the terminal device 2, the data code generation server 3, the data recovery device 4 and the data management server 5 by being applied to the existing general-purpose computer.

A method of providing the program mentioned above is voluntarily selected. For example, the program may be stored in a recording medium (flexible disc, compact disc (CD)-ROM, digital versatile disc (DVD)-ROM) which is readable by a computer so as to be distributed, or the program may be stored in a storage on a network such as an internet and be provided by downloading.

Further, in a case where the processing mentioned above is executed by sharing between an operating system (OS) and an application program, or collaboration between the OS and the application program, only the application program may be stored in the recording medium or the storage. Further, the program may be superimposed on a carrier wave and delivered via a network. For example, the program may be posted to a bulletin board (BBS: Bulletin Board System) on the network, and the program may be delivered via the network. Further, the processing mentioned above may be configured to be executed by starting the program and executing the program under the control of the OS in the same manner as the other application program.

The present invention may be variously embodied and modified without deviating from the broad scope and range of the present invention. Further, the embodiment mentioned above is provided for describing an example of the present invention, and does not restrict the scope of the present invention.

REFERENCE SIGNS LIST

1 data management system
2 terminal device
3 data code generation server
4 data recovery device
5 data management server
21 imaging unit
22 storage unit
23 touch panel
24 communication unit
25 control unit
31 communication unit
32 control unit
41 imaging unit
42 communication unit
43 display unit
44 control unit
51 communication unit
52 storage unit
53 control unit
100 QR code (registered trademark)
104 positioning symbol
106 information code recording area
108 timing cell
109 format code
200 ID card
300 top screen
301 imaging screen display instruction icon
302 data code display instruction icon
310 imaging screen
400 data code

The invention claimed is:

1. A data recovery system, comprising:
a terminal device configured to save a first data set from among the first data and a second data set and to upload the second data set to a data management server via a network, the first data set and the second data set being obtained by partitioning a binary data set, and
a data recovery device configured to acquire the first data set from the terminal device, to acquire the second data set corresponding to the acquired first data set from the data management server via the network, and to recover the binary data from the acquired first data set and the second data set.

2. The data recovery system of claim 1 wherein the terminal device is configured to partition the binary data set into the first data set and the second data set.

3. The data recovery system of claim 1 wherein the binary data set codes an image of an identification or credit card.

4. A data management server system comprising:
a terminal device which saves a first data set from among the first data set and a second data set in association with an identification information code and uploads the second data set and the identification information code via a network, the first data set and the second data set being obtained by partitioning a binary data file, and the identification information code being capable of identifying the first data set and the second data set;
a data recovery device which recovers the binary data from the first data and the second data; and
a data management server connected to the terminal device and the data recovery device via the network, the data management server including:
a storage unit which saves the second data set uploaded from the terminal device and the identification information code in association with each other; and
a control unit which detects the second data set corresponding to the identification information code from the storage unit in response to receiving the identification information code transmitted via the network from the data recovery device acquiring the first data set and the identification information code from the terminal device, and transmits the detected second data set to the data recovery device via the network, thereby allowing the data recovery device to recovery the binary data.

5. The data management system of claim 4 wherein the terminal device is configured to partition the binary data set into the first data set and the second data set.

6. The data management system of claim 4 wherein the binary data set codes an image of an identification or credit card.

7. A data recovery method comprising the steps of:
operating a data recovery device to save a first data set from among the first data set and a second data set which are obtained by partitioning a binary data file, and acquire the first data set from a terminal device which uploads the second data set to a data management server via a network;
operating the data recovery device to acquire the second data set corresponding to the acquired first data set from the data management server via the network; and
all operating the data recovery device to recover the binary data file from the acquired first data set and second data set.

8. The data recovery method of claim 7 wherein partitioning of the binary data file into the first data set and the second data set includes operating a terminal device to partition the binary data file into the first data set and the second data set.

9. The data recovery method of claim 7 wherein the binary data file codes an image of an identification or credit card.

10. A data recovery method executed by a data management system, comprising:
operating a terminal device to save first data and second data in association with identification information,
uploading the second data and the identification information to a storage unit connected to the terminal device and to a data recovery device via a network, the first data and the second data being obtained by partitioning binary data, the identification information being capable of identifying the first data and the second data,
operating the data recovery device to recover the binary data from the first data and the second data, and to save the second data and the identification information uploaded from the terminal device in association with each other,
operating a data management server to detect the second data corresponding to the identification information in the storage unit in response to receiving the identification information transmitted via the network from the data recovery device which acquires the first data and the identification information from the terminal device; and
operating a data management server to transmit the detected second data to the data recovery device via the network, thereby allowing the data recovery device to recover the binary data.

11. The data recovery method of claim 10 wherein the operating of the terminal device includes operating the terminal device to partition the binary data into the first data and the second data.

12. The data recovery method of claim 10 wherein the binary data set codes an image of an identification or credit card.

13. A data recovery method executed by a data management system, comprising:

operating a terminal device to save a first data set and a second data set in association with identification information;
uploading the second data set and the identification information via a network to a storage unit of a data management server which is connected to the terminal device via the network, the first data set and the second data set being obtained by partitioning a binary data set, the identification information being capable of identifying the first data set and the second data set;
storing the second data set and the identification information uploaded from the terminal device in association with each other in the storage unit; and
operating a data recovery device, which is connected to the data management server via the network, to recover the binary data set from the first data set and the second data set,
wherein:
the data recovery device acquires the first data set and the identification information from the terminal device, and transmits the identification information to the data management server via the network;
the data management server detects the second data set corresponding to the identification information from the storage unit in response to receiving the identification information from the data recovery device via the network;
the data management server transmits the detected second data set to the data recovery device via the network; and
the data recovery device recovers the binary data set from the received second data set and the first data set acquired from the terminal device in response to receiving the second data set corresponding to the identification information transmitted from the data management server via the network.

14. The data recovery method of claim 13 wherein the operating of the terminal device includes operating the terminal device to partition the binary data set into the first data set and the second data set.

15. The data recovery method of claim 13 wherein the binary data set codes an image of an identification or credit card.

16. A program configured to operate a computer to execute commands, the program comprising a non-transitory computer readable medium that when executed operates the computer to:
acquire a first data set from a terminal device which saves the first data set from among the first data set and a second data set and uploads the second data set to a data management server via a network, the first data and the second data being obtained by partitioning a binary data set;
a acquire, from the data management server via the network, the second data set corresponding to the acquired first data set; and
recover the binary data set from the acquired first data set and the second data set.

17. The program of claim 16 wherein partitioning of the binary data set into the first data set and the second data set includes operating the terminal device to partition the binary data set into the first data set and the second data set.

18. The program of claim 16 wherein the binary data set codes an image of an identification or credit card.

19. A program configured to operate a computer of a data management server to execute commands, the data management server comprising a storage unit which is connected to a terminal device and a data recovery device via a network, the program comprising a non-transitory computer readable medium that when executed performs the commands of:
- operating the terminal device to save a first data set and a second data set in association with identification information, the first data set and the second data set being obtained by partitioning a binary data set, the identification information being capable of identifying the first data set and the second data set, the terminal device uploading the second data set and the identification information via the network to the data management server;
- operating the data management server to save the second data set and the identification information from the terminal device in association with each other in the storage unit;
- operating the data recovery device to recover the binary data set from the first data set and the second data set,
- wherein the commands comprise:
- detecting the second data set corresponding to the identification information from the storage unit in response to receiving the identification information transmitted, from the data recovery device acquiring the first data set and the identification information from the terminal device; and
- transmitting the detected second data set to the data recovery device via the network, thereby allowing the data recovery device to recovery the binary data set.

20. The program of claim 19 wherein partitioning of the binary data set into the first data set and the second data set includes operating the terminal device to partition the binary data set into the first data set and the second data set.

* * * * *